3,125,532
METHOD OF DOPING SEMICONDUCTOR MATERIAL

Wolfgang Keller, Pretzfeld, Oberpfalz, Germany, assignor to Siemens-Schuckertwerke Aktiengesellschaft, Berlin-Siemensstadt, Germany, a corporation of Germany
No Drawing. Filed Mar. 28, 1961, Ser. No. 98,772
Claims priority, application Germany Mar. 31, 1960
13 Claims. (Cl. 252—62.3)

My invention relates to a method for manufacturing and processing of high-purity semiconductor bodies applicable in rectifiers, transistors, photodiodes and other electronic semiconductor devices and is a continuation-in-part of my application Serial No. 818,519, now abandoned.

Relatively large quantities of such materials, for example germanium and silicon, are required in industry, and it is necessary to impart to the semiconductor material a given electric conductance as well as a given type of conductance, depending upon the particular application intended.

It is known to use silicon of high-ohmic resistance in rod shape as starting material for the production of the above-mentioned semiconductor bodies. For some purposes, the processing of such silicon rods requires adding to the silicon a beneficial impurity substance, particularly a doping substance serving as a donor or acceptor to produce n-type or p-type conductance. It is known for such processing of germanium to introduce the impurity substance by zone pulling. However, most doping substances applicable for zone pulling of germanium are not suitable for silicon because they possess an excessively high vapor pressure at the melting temperature of silicon and their distribution coefficient departs too greatly from the unity value. These two properties are detrimental to obtaining in the silicon crystal the desired accurate and reproducible dosage of the doping substance and the best uniform distribution of such substance over the length of the rod.

It is an object of my invention to obviate the difficulties thus encountered.

According to a feature of my invention, relating to a method for the doping of silicon for use in rectifiers, transistors, photodiodes and other electronic semiconductor devices, I first incorporate the doping substance in a mass of glass. I then melt or fuse the prepared glass onto the surface of the silicon rod to be processed and subsequently subject the prepared rod to zone pulling and levelling.

According to another, preferred feature of my invention, a filament of glass, containing the doping substance, is laid upon a silicon rod and then fused onto the rod surface. Prior to fusing, the glass filament may be glued to the rod, for example, by means of water glass. The melting of the filament is preferably effected in a protective gas atmosphere at approximately 1000° C.

I may also use in lieu of glass, a chemical compound of the vitreous type, i.e. a compound that can be fused or melted in substantially the same manner as glass and assume a glass-like consistency. In all other respects, the process can be performed exactly as described with reference to glass below.

It has been found that the method according to the invention affords obtaining accurate and reproducible parameter values of the silicon material. The method is applicable to introduce n-doping (donor) as well as p-doping (acceptor) substances into the semiconductor material. This is particularly important for silicon because no satisfactory method has heretofore become known that permits suitably reducing the specific electric resistance of the very high ohmic rods.

It has been found favorable, for example, to use silicon with a specific resistance of approximately 2 to 3 ohm cm. for the so-called "core doping" of the material. When starting with a silicon material having a specific resistance of approximately 1200 ohm-cm., the required low resistance value can be obtained in a relatively simple manner by applying the above-described method of the invention. By properly selecting the amount of doping substances contained in the glass, and also the thickness of the glass filaments being used, a substantially exact dosage of the doping substances can be introduced into the silicon rod.

A method of the invention will be explained presently with reference to a specific example.

A monocrystalline, p-type silicon rod of approximately 15 cm. length and 12 mm. diameter having, as raw material, a specific electric resistance of 1200 ohm-cm. was used. The specific resistance was to be reduced down to 2 to 3 ohm-cm. by doping the silicon with boron, while maintaining the original conductance type. For this purpose, a filament of soft glass (AR-glass defined below) containing boron was fastened at both ends to the rod by means of water glass. The filament had a diameter of about 0.1 mm. and a weight of 3.8 mg. Thereafter, the assembly was heated in a furnace and within a protective atmosphere at approximately 1000° C. and was thus melted and fused to the silicon.

When the melting temperature is maintained during too short a period of time, the glass may scale off. For that reason, the melting operation was extended to approximately one hour. The rod was thereafter permitted to slowly cool to room temperature. Subsequently, the rod was subjected to several passes of a crucible-free zone-melting operation. This method, known as such, causes the boron to penetrate into the silicon and to be built into the crystal lattice, while the other components of the glass are reduced and evaporated. After the above-described processing, the boron-doped silicon rod exhibited the desired specific resistance of a 2 to 3Ω cm.

If the silicon rod is to be doped for n-type conductance, the above-described method is modified by using a glass that contains a donor substance. Suitable for this purpose is boron-free glass which contains phosphorus compounds as doping agent.

When boron is used as doping substance, it is generally sufficient to subject the rod to zone pulling in only one direction because the distribution coefficient of boron in silicon is nearly =1. With other doping substances, it is necessary to shift the melting zone back and forth along the rod during zone pulling operation, this method being known as "zone levelling," in order to obtain a uniform distribution of the doping substance along the monocrystal.

A suitable apparatus and procedure for carrying out the zone pulling is described in the copending application of Reimer Emeis, Serial No. 409,610, filed February 11, 1954, now Patent 3,030,194, and Serial No. 727,610, filed April 10, 1958, now Patent No. 2,972,525. All of the pertinent subject matter of said applications is included herein by reference. The zone pulling essentially comprises mounting the semiconductor rod vertically in an enclosed vessel, which may be subjected to dynamic vacuum, that is, to constant withdrawal of gases from the vessel. A high-frequency induction coil, situated within the vessel, and extending about a minor length of the rod, is moved longitudinally along the rod to produce a small molten region of limited length which is substantially self-supported. The molten zone moves along the semiconductor rod. This is repeated several times. A gas inert in the process to silicon and boron, that is a protective gas, may be introduced, the pressure being preferably maintained at below atmospheric, or at high vacuum. Hydrogen or argon gas may be introduced. The semiconductor rod may be polycrystalline or monocrystalline, initially, or may be seeded with a monocrystalline seed to produce a monocrystalline rod.

For p-doping glass filaments containing boron or other useful substances such as aluminum or gallium can be used. For n-doping, the glass filaments must contain donors such as phosphorus, arsenic, antimony, bismuth or selenium.

Commercial glasses, e.g. AR-glass, containing suitable amounts of doping agents can be processed. Most glasses are also available as filaments. In the event the glass used does not contain the desired doping material, one can add such doping material to the glass while it is in a molten state.

The mentioned AR-glass for example is a soft glass melting at about 550° C. which consists of 65.2% $SiO_2$, 11.9% $Na_2O$, 3.3% $K_2O$, 7.7% CaO, 4.8% BaO, 5.2% $Al_2O_3$, 1.7% $B_2O_3$, 0.2% $Fe_2O_3$. The low melting point is helpful for the fusing procedure.

While the process has thus far been described with reference to glass, vitrifiable compounds containing suitable doping agents may also be used.

For example, a vitreous mass can be produced from borax powder. Such vitreous masses are not as stable as glass, but disintegrate into powder after a prolonged period of time due to taking up water of crystallization.

Vitrifiable compounds suitable to act as acceptors (p-type) for silicon are the borates and metaborates of alkali and alkaline earth metals, e.g. lithium-beryllium-borate, and indium chloride. Suitable as donors (n-type) for silicon are the metaphosphates, polymetaphosphates, and pyrophosphates of the alkali and alkaline earth metals. Also suitable as donors are silver orthophosphate ($Ag_3PO_4$), silver metaphosphate ($AgPO_3$), and silver pyrophosphate ($Ag_4P_2O_7$), secondary and tertiary sodium arsenate ($Na_2HAsO_4 \cdot 7H_2O$, $Na_2HAsO_4 \cdot 12H_2O$, $$Na_3AsO_4 \cdot 12H_2O)$$

bismuth oxide ($Bi_2O_3$) and antimony oxide ($Sb_2O_3$).

The following example, while performed with borax ($Na_2B_4O_7 \cdot 10H_2O$) is typical of the application of vitrifiable compounds in accordance with the invention. Borax was melted and drawn into thin filaments. A rod of hyperpure polycrystalline silicon having a specific resistance of approximately 1000 ohm-cm., a diameter of 12 mm., and a length of 20 cm. length was used. A borax filament of 3.1 mg. weight was attached with water glass to the silicon rod, extending lengthwise thereof. Subsequently, the rod was heated, thereby fusing the filament to the silicon rod. The fusing time was approximately 1 hour. The fusing temperature was 1000° C. Thereafter, the rod was subjected to crucible-free zone melting in high vacuum and was converted into a monocrystal with the aid of a monocrystalline seed fused to the rod. After such processing, the silicon exhibited a specific resistance of 0.05 ohm-cm., and had p-type conductance due to doping with boron. The rod is suitable for the production of semi-conductor material containing a predetermined amount of doping, for example in accordance with the method described in the copending application Serial 841,026, now Patent No. 2,970,111.

I claim:
1. A method for doping semiconductor silicon, for making a semiconductor device, comprising fusing a vitreous material comprising a doping substance, to a semiconductor silicon rod, and subsequently subjecting the rod to a crucible free floating zone melting causing a molten zone to be displaced lengthwise of the rod.

2. A method for uniformly doping silicon for use in rectifiers, transistors and other electric semiconductor devices, comprising fusing glass which contains the doping substance onto the surface of a silicon rod, and subsequently subjecting the rod to zone melting.

3. A method of uniformly doping a body of silicon for use in rectifiers, transistors, and other electric semiconductor devices, characterized in that a filament of glass containing the doping substance is placed upon a silicon rod and is melted onto the rod surface, and subsequently subjecting the rod to a crucible free floating zone melting under vacuum.

4. A method of uniformly doping a body of silicon for use in rectifiers, transistors, and other electric semiconductor devices, characterized in that a filament of glass containing the doping substance is initially attached to a silicon rod by means of water glass and is then melted onto the rod surface, and subsequently subjecting the rod to zone melting by causing a molten zone to be displaced lengthwise in the rod, the zone melting being under vacuum.

5. A method of doping silicon for use in rectifiers, transistors, and other electric semiconductor devices, characterized in that glass which contains the doping substance is melted onto a silicon rod at about 1000° C. in a protective gas, and that the rod is subsequently subjected to zone melting wherein a molten zone is caused to be displaced lengthwise in the rod.

6. The method defined in claim 5, the melting at about 1000° C. being carried out for about one hour, the glass being thereafter slowly cooled.

7. A method of doping silicon for use in rectifiers, transistors, and other semiconductor devices, characterized in that a vitrified material containing a doping substance of the group consisting of phosphorus, boron and boron oxide is fused onto the surface of a silicon rod, and subsequently subjecting the rod to zone melting wherein a molten zone is caused to be displaced lengthwise in the rod.

8. The method defined in claim 7, the vitrified material being soft glass.

9. A method of uniformly n-doping silicon for use in rectifiers, transistors, and other semiconductor devices, characterized in that a boron-free glass containing a phosphorus doping agent is fused onto the surface of a silicon rod, and subsequently subjecting the rod to zone melting wherein a molten zone is caused to be displaced lengthwise in the rod.

10. A method of uniformly p-doping silicon for use in rectifiers, transistors, and other semiconductor devices, characterized in that glass comprising boron and oxides of sodium, calcium, and silicon is fused onto the surface of a silicon rod, and subsequently subjecting the rod to zone melting wherein a molten zone is caused to be displaced lengthwise in the rod, the zone melting of the silicon being under vacuum causing the content of sodium and calcium to be vaporized and zone refined off.

11. A method of p-doping silicon for use in rectifiers, transistors, and other semiconductor devices, characterized in that glass comprising oxides of boron, sodium, calcium, and silicon is fused by heating onto the surface of a silicon rod, and that the rod is subsequently subjected to zone melting wherein a molten zone is caused to be displaced lengthwise in the rod, the zone melting of the silicon being under vacuum causing the content of sodium and calcium to be vaporized and zone refined off, said glass being a soft glass and being initially attached to the silicon rod by means of water glass before being fused thereon.

12. A method of p-doping silicon for use in rectifiers, transistors, and other semiconductor devices, characterized in that a vitrified borax is fused onto the surface of a silicon rod, and subsequently subjecting the rod to crucible-free zone melting wherein a molten zone is caused to be displaced lengthwise in the rod.

13. A method for n-doping silicon for use in rectifiers, transistors, and other semiconductor devices, characterized in that a vitrified phosphate is fused onto the surface of a silicon rod, and subsequently subjecting the rod to crucible-free zone melting wherein a molten zone is caused to be displaced lengthwise in the rod.

References Cited in the file of this patent

UNITED STATES PATENTS

| | | |
|---|---|---|
| 2,739,088 | Pfann | Mar. 20, 1956 |
| 2,794,846 | Fuller | June 4, 1957 |

OTHER REFERENCES

Hannay: Semiconductors, Reinhold, 1959, QC 611, pages 166–199 (esp. page 171).